US006615133B2

United States Patent
Boies et al.

(10) Patent No.: US 6,615,133 B2
(45) Date of Patent: Sep. 2, 2003

(54) APPARATUS, SYSTEM, METHOD AND COMPUTER PROGRAM PRODUCT FOR DETERMINING AN OPTIMUM ROUTE BASED ON HISTORICAL INFORMATION

(75) Inventors: Stephen J. Boies, Mahopac, NY (US); Samuel H. Dinkin, Austin, TX (US); David Perry Greene, Ossining, NY (US); Paul Andrew Moskowitz, Yorktown Heights, NY (US); Philip S. Yu, Chappagua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/794,275

(22) Filed: Feb. 27, 2001

(65) Prior Publication Data

US 2002/0120396 A1 Aug. 29, 2002

(51) Int. Cl.[7] ............................................. G08G 1/123
(52) U.S. Cl. ........................ 701/209; 701/117; 701/214; 340/905; 340/994
(58) Field of Search ................................ 701/209, 210, 701/211, 202, 117, 207, 201, 208, 200, 212, 214; 455/456; 340/988, 990, 995, 905, 994; 345/353

(56) References Cited

U.S. PATENT DOCUMENTS

| | | | | |
|---|---|---|---|---|
| 5,774,073 A | * | 6/1998 | Maekawa et al. | 340/995 |
| 5,818,356 A | * | 10/1998 | Schuessler | 340/995 |
| 5,919,246 A | * | 7/1999 | Waizmann et al. | 701/209 |
| 6,034,626 A | * | 3/2000 | Maekawa et al. | 340/995 |
| 6,292,743 B1 | * | 9/2001 | Pu et al. | 701/202 |
| 6,298,301 B1 | * | 10/2001 | Kim | 701/200 |
| 6,317,684 B1 | * | 11/2001 | Roeseler et al. | 701/202 |
| 6,356,839 B1 | * | 3/2002 | Monde et al. | 701/210 |
| 2001/0047242 A1 | * | 11/2001 | Ohta | 701/210 |

* cited by examiner

Primary Examiner—Thomas G. Black
Assistant Examiner—Tuan C To
(74) Attorney, Agent, or Firm—Duke W. Yee; Stephen C. Kaufman; Stephen J. Walder, Jr.

(57) ABSTRACT

An apparatus, system, method and computer program product for determining optimum routing of vehicles based on historical information as well as user preferences and current travel conditions. Historical data is compiled and statistically analyzed to determiner characteristics of each possible route between two points. The characteristic information is then used along with user preference information and current travel condition information to determine an optimum route between the two points.

38 Claims, 4 Drawing Sheets

| LEG IDENTIFIER | GPS START/END LOCATION | RAIN | SNOW | ICE | CRIME | TRAFFIC ENFORCE | ... |
|---|---|---|---|---|---|---|---|
| LEG 105 | 210.345, 1315.47/222.50, 1350.00 | 2 | −1 | −3.25 | 5 | 10 | ... |
| LEG 215 | 410.345, 1518.47/254.50, 1600.00 | 2 | −4 | −4.73 | −0.5 | −7.25 | ... |
| ⋮ | ⋮ | ⋮ | ⋮ | ⋮ | ⋮ | ⋮ | ⋮ |

610 / 620 / 630

A — ROAD CONSTRUCTION
B — MANY ACCIDENTS DURING ICY CONDITIONS
C — MANY TRAFFIC TICKETS DURING WEEKDAYS
D — HEAVY CRIME AREA
E — FLOODING DURING RAIN CONDITIONS

APPARATUS, SYSTEM, METHOD AND COMPUTER PROGRAM PRODUCT FOR DETERMINING AN OPTIMUM ROUTE BASED ON HISTORICAL INFORMATION

BACKGROUND OF THE INVENTION

1. Technical Field

The present invention provides an apparatus, system, method and computer program product for determining an optimum route based on historical information.

2. Description of Related Art

Many vehicle navigation systems are known in the art for obtaining an "optimum" route between a starting location and an ending location. These "optimum" routes, however, are typically determined to be either the route having the shortest travel distance between two points or the route having the shortest travel time.

Some vehicle navigation systems that determine "optimum" routes make use of current traffic situations to augment their determination of travel times. In other words, the occurrence of certain traffic situations, such as a road being blocked, an accident, road construction, and the like, influence the travel time. These navigation systems, however, very often do not provide the actual optimum route because they do not take into consideration many factors that influence whether a route provides the best overall travel experience to the user. For example, using the prior art systems, a user may be able to travel from point A to point B along a path that is the shortest travel distance, but may be delayed considerably by flooding of the road, may be involved in an accident due to icy conditions, may be subjected to a high crime area, or the like. Similarly, a prior art system may determine that a particular route from point A to point B is the shortest travel time and end up being incorrect because factors other than the current traffic conditions may cause delays in traveling along the path.

SUMMARY OF THE INVENTION

The present invention provides an apparatus, system, method and computer program product for determining an optimum route for a vehicle based on historical data. The present invention provides a mechanism by which historical data regarding legs of a travel path is used to compare various possible routes between a starting point and an ending point. Based on the comparison, an optimum route is determined in accordance with selection criteria entered by a party requesting the optimum route determination. The historical data used may include measured data obtained from other vehicles as well as environmental data, traffic data, crime data, statistical data, and the like, obtained from one or more historical data suppliers. The historical data is compiled and statistically analyzed to determine characteristics of each possible route, and legs of each possible route, between two points.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
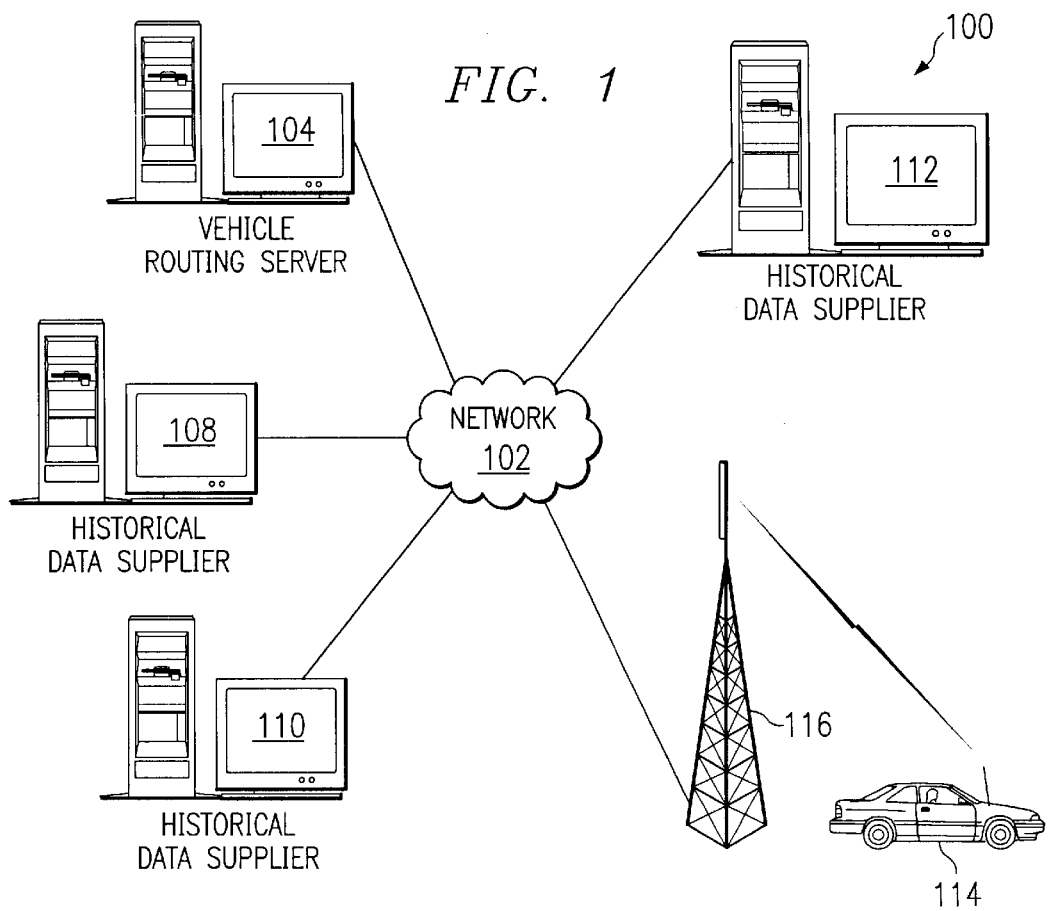
FIG. 1 is an exemplary block diagram of a distributed data processing system in accordance with the present invention.

With reference now to the figures, FIG. 1 is a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wired links, wireless communication links, satellite communication links, infrared communication links, fiber optic cables, and the like.

In the depicted example, a vehicle routing server 104 is connected to network 102. In addition, history data supplier systems 108–112 are also connected to network 102. The history data supplier systems 108–112 may be, for example, personal computers, portable computers, servers, databases, mainframe computers, or the like. The history data supplier systems 108–112 supply historical information regarding legs of travel paths to vehicle routing server 104. Network data processing system 100 may include additional servers, historical data supplier systems, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The history data suppliers 108–112 provide historical data to the vehicle routing server. The historical data may be any type of data that may affect the selection of optimum routes. For example, the historical data may include environmental condition information, weather condition information, traffic condition information, road condition information, criminal activity information, traffic law enforcement information, accident information, and the like. This information will be provided along with indicators of date and time of the various conditions. The history data supplier 108, for example, may be a weather reporting historical data supplier, history data supplier 110 maybe a criminal activity reporting historical data supplier, and history data supplier 112 may be a traffic/road condition reporting historical data supplier.

The historical data provided by the historical data suppliers 108–112 is preferably compartmentalized into established routing legs. That is, within a geographical area, routing legs are defined and established as a means by which historical data is reported. For example, a leg may be a portion of a route existing between intersections of a roadway, a portion of a route existing between two landmarks, a portion of a route existing between two way points which may be set deliberately or arbitrarily, and the like. A route between a starting point and an ending point may comprise one or more of these legs.

The historical data is compartmentalized into legs each having various characteristics as determined from the historical data obtained from the historical data suppliers 108–112. Thus, for leg 1, weather, traffic, and road condition information may be compiled along with traffic law enforcement, criminal activity information and accident information. This information is preferably stored in a database in the respective historical data suppliers 108–112 until it is ready for upload to the vehicle routing server 104. The information may be stored in a manner such that the data is indexed by a leg designator, for example.

The vehicle routing server 104 receives the historical data from the historical data suppliers 108–112, compiles and correlates the historical data to determine characteristics of each leg, and stores or updates the leg characteristics in a database 118. In addition to the historical data from the historical data suppliers 108–112, vehicle historical information from one or more vehicles is provided to the vehicle routing server 104. The vehicle historical information provides, for example, information relating to average speeds through various legs of a route, elapsed time to travel from one end of a leg to the other, and the like. This information is also used to identify various characteristics of the predefined legs.

The vehicle historical information may be reported to the vehicle routing server 104 by way of a wireless transmitter in a vehicle, such as vehicle 114. The wireless transmitter sends the vehicle historical information to a base station 116 which is coupled to the network 102 via a wired or wireless connection. The base station 116 then transmits the vehicle historical information to the vehicle routing server 104 via the network 102. The vehicle historical information may be uploaded from the vehicle 114 to the vehicle routing server 104 via the base station 116 upon the occurrence of an event, at predetermined time intervals, or the like. For example, the vehicle historical information may be uploaded as each leg of a route is completed, with measuring instruments in the vehicle being initialized at the start of each new leg. Alternatively, the vehicle historical information may be stored in a memory of the vehicle 114 until the entire route is completed at which time the information may be uploaded to the vehicle routing server 104.

The historical data obtained from the historical data suppliers 108–112 and the vehicle historical data are correlated to identify characteristics of the various predefined legs. The characteristics are stored in the database 118 of the vehicle routing server 104. From the characteristic information stored in the database 118 of the vehicle routing server 104, estimated times of traversing a leg may be determined for various conditions. For example, estimated times of traversing a leg in normal conditions, rain, snow, flood conditions, night, day, weekday, weekend, during construction, and the like. In addition probabilities of receiving a traffic ticket, being subjected to criminal activity, and the like may be determined. The estimated times and the probability information may be utilized along with user selections of preferred route criteria, to determine an optimum route to travel from a starting point to an ending point.

For example, assume a user wishes to travel from a starting point to an ending point with a low probability of getting a traffic ticket and the current environmental conditions indicate that it is raining. Under these criteria, a route having legs that are not subject to flooding and have a lower history of traffic tickets being written would be preferred over another route in which either flooding is a problem or high incidents of traffic tickets are identified. The determination may be made by a routing algorithm that takes into consideration the characteristics of each leg of each possible route between the starting point and the ending point as well as current traveling conditions and user preferences.

Similarly, assume that another user wishes to travel from a starting point to an ending point with a low probability of being involved in an accident and the current environmental conditions indicate that it is snowing. Under these criteria, a route having legs that have fewer overpasses, bridges and areas where, historically, the road becomes slippery during icy conditions, may be preferred over another route. Further, of the routes having no overpasses, bridges, etc., a route having a historically lower number of accidents may be preferred over others, for example.

Alternatively, for example, a score for each possible route between a start point and an end point may be calculated and compared to scores of other routes between the start and end points. The scores may be calculated using a route determination algorithm that provides various scores to various characteristics of a route. The characteristics for the route are determined based on the historical information received from the historical data suppliers 108–112. Thus, based on the historical information received, a statistical analysis may be made to determine if a route, or portion of a route such as a leg, is a low, medium or high crime area, low, medium or high traffic enforcement area, has a low, medium or high probability of flooding, and the like. Each of these characteristics may be provided with a score.

For example, a high income residential area (which may be determined based on residential tax revenue data, for example) may be given a score of 5 while an area having a high crime rate may be given a score of −1. Based on the total scores for each possible route between the start point and the end point, a determination of the optimum route may be made, e.g., the route having the highest score is the optimum.

The score for a route may be a sum of the scores for each leg of the route. Thus, the various characteristics for each leg, as identified by the compiled historical information, may be given scores and the total score for each leg of a route summed together to obtain an overall total score for the route.

The scores may be weighted by the current situation parameters and the criteria entered by the user of the vehicle for identifying an optimum route. For example, if the user wishes to avoid a high crime area, the score for the crime activity in the area may be weighted more heavily, e.g., given a multiplier of 2 or the like. Likewise, if the current situation indicates that it is raining, a rain based characteristic of the leg of the route may receive a smaller or heavier weight, e.g. 0.1 or 3, depending on the particular embodiment. Thus, if a leg of the route typically floods during raining conditions, the rain characteristic score for that leg may be given a −0.5 and a multiplier of 1.5.

Other ways of identifying an optimum route based on historical information may be used without departing from the spirit and scope of the present invention. For example, expert systems, neural networks, rule based systems, inference engines, data mining techniques, and the like, may be used to identify an optimum route based on the historical data obtained from the historical data suppliers 108–112 and criteria entered by a user. For purposes of the following description of the preferred embodiments, it will be assumed that the above described scoring technique will be used, although it should be understood that the present invention is not limited to this particular technique.

Figure 2:
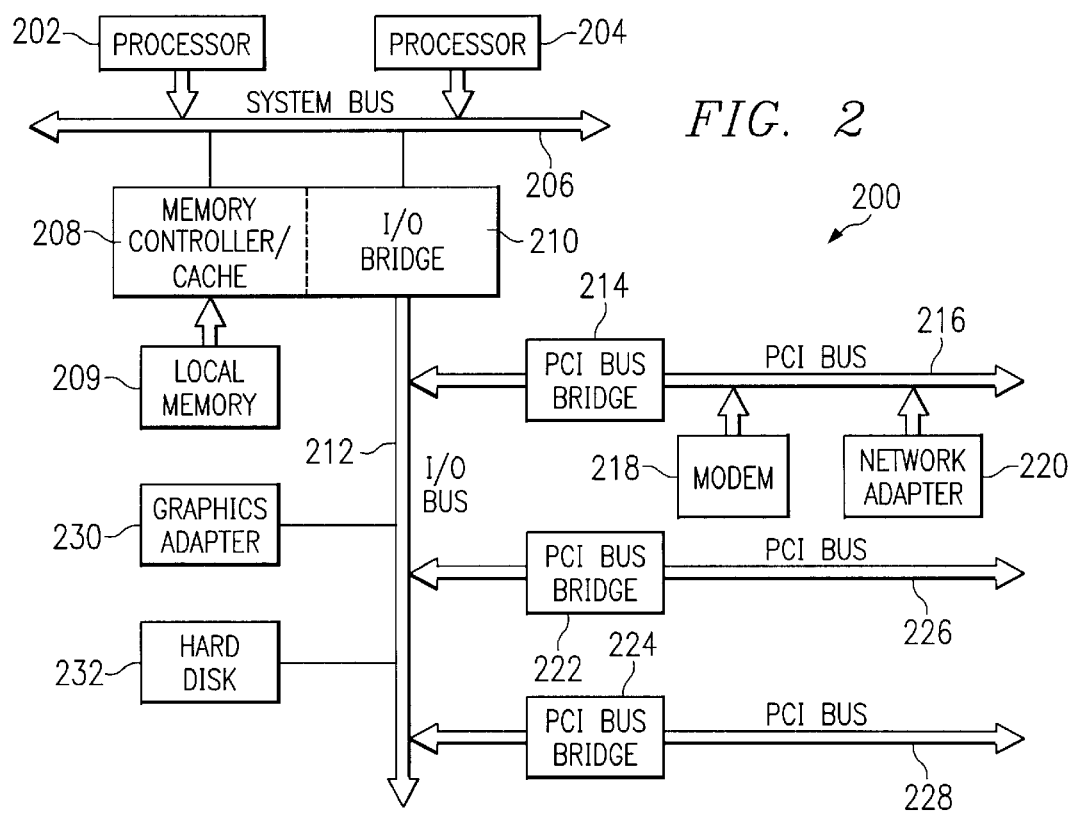
FIG. 2 is an exemplary block diagram of a data processing system that may be used to implement the server of the present invention.

Referring to FIG. 2, a block diagram of a data processing system that may be implemented as a server, such as vehicle routing server 104 or historical data suppliers 108–112 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 maybe integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

The data processing system in FIG. 2 may execute one or more stored applications for performing the various functions of the present invention. Alternatively, the functionality of the present invention may be "hardwired" into the hardware of the data processing system or into additional components coupled to the data processing system shown in FIG. 2. It will be assumed for purposes of the description of the present invention that the invention is implemented as machine readable instructions that are executed by the data processing system shown in FIG. 2, although it should be appreciated that the present invention is not limited to such an embodiment.

Figure 3:
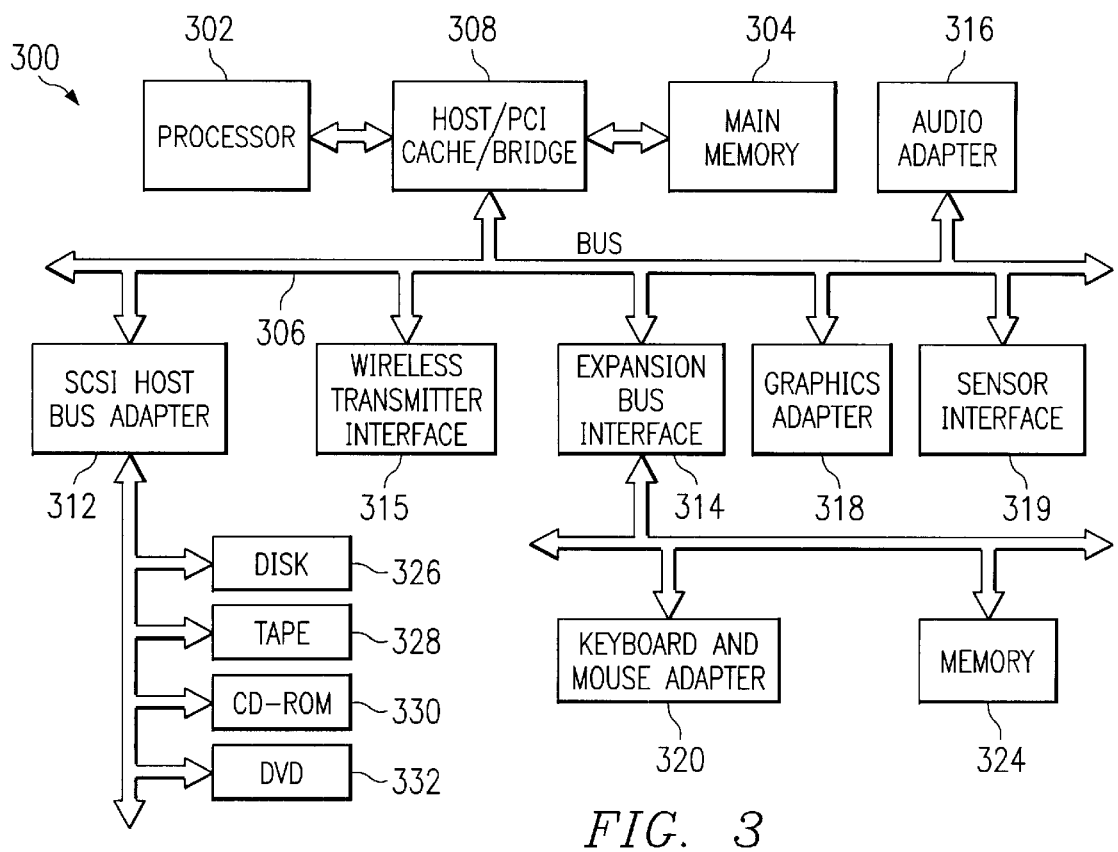
FIG. 3 is an exemplary block diagram of a data processing system that may be used to implement a client system in accordance with the present invention.

With reference now to FIG. 3, a block diagram illustrating a data processing system is depicted in which the present invention may be implemented. Data processing system 300 is an example of a client computer, such as a computer installed in vehicle 114, for example. Although in a preferred embodiment, the client computer is positioned in a vehicle, the invention is not limited to such. Rather, the client computer may be a standard desktop computer, laptop computer, personal digital assistant, or the like, and may not be associated directly with a vehicle.

In addition, the data processing system 300 shown in FIG. 3 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, SCSI host bus adapter 312, expansion bus interface 314 and wireless transmitter interface 315 are connected to PCI local bus 306 by direct component connection. In contrast, audio adapter 316, graphics adapter 318, and sensor interface 319 are connected to PCI local bus 306 by add-in boards inserted into expansion slots.

Expansion bus interface 314 provides a connection for a keyboard and/or pointing device adapter 320 and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system may run on processor 302 and may be used to coordinate and provide control of various components within data processing system 300 in FIG. 3. The operating system may be a commercially available operating system, such as Linux or Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. In addition, rather than a keyboard or pointing device, a touchscreen or other input/output device adapter may be used. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
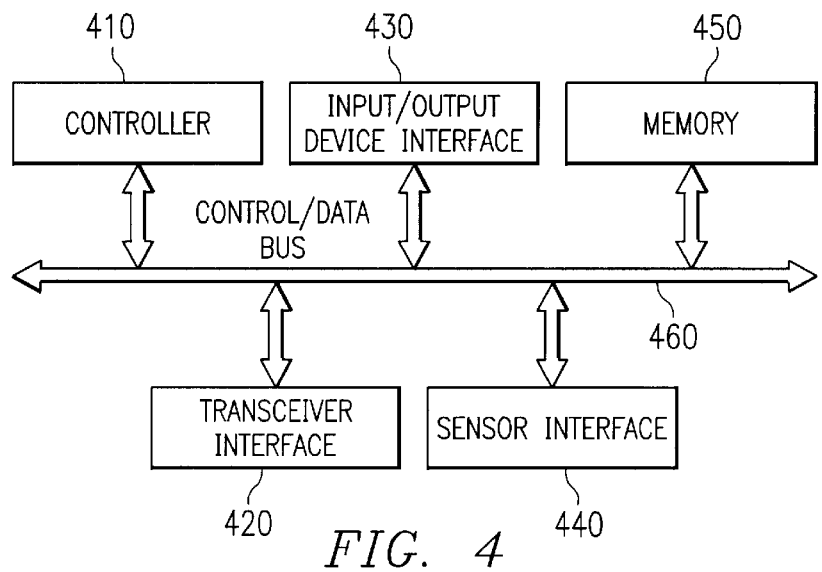
FIG. 4 is an exemplary functional block diagram of a client device according to the present invention.

FIG. 4 is an exemplary functional block diagram illustrating the primary functional components of the client device according to the present invention. The elements of the functional block diagram of FIG. 4 may be implemented as hardware, software, or a combination of hardware and software components. In a preferred embodiment, the functional elements shown in FIG. 4 are implemented as software instructions executed by one or more of the hardware elements shown in FIG. 3.

As shown in FIG. 4, the client device includes a controller 410, a transceiver interface 420, an input/output device interface 430, a sensor interface 440, and a memory 450. These elements are in communication with one another via the control/data bus 460. Although a bus architecture is shown in FIG. 4, the present invention is not limited to such and any architecture allowing for the communication of control messages and data between the elements 410–450 may be used without departing from the spirit and scope of the present invention.

The controller 410 controls the overall operation of the client device. The controller 410 receives input from a user via the input/output interface 430 and sends requests for routing information to a vehicle routing server via the transceiver interface 420. The controller 410 receives the routing information from the vehicle routing server and causes the information to be displayed to the user via the input/output interface 430 and an output device coupled to the input/output interface 430 (not shown).

In addition, the controller 410 receives sensor data via the sensor interface 440 and stores the sensor data in memory 450 in association with a leg of a route being followed by the vehicle. For example, the sensor data may comprise speed data, position data from a global positioning system, and the like. The position data may be used to determine a current position along a route so that the speed data may be correlated with a particular leg of the route. This information may be uploaded to the vehicle routing server via the transceiver interface 420.

Figures 5, 6:
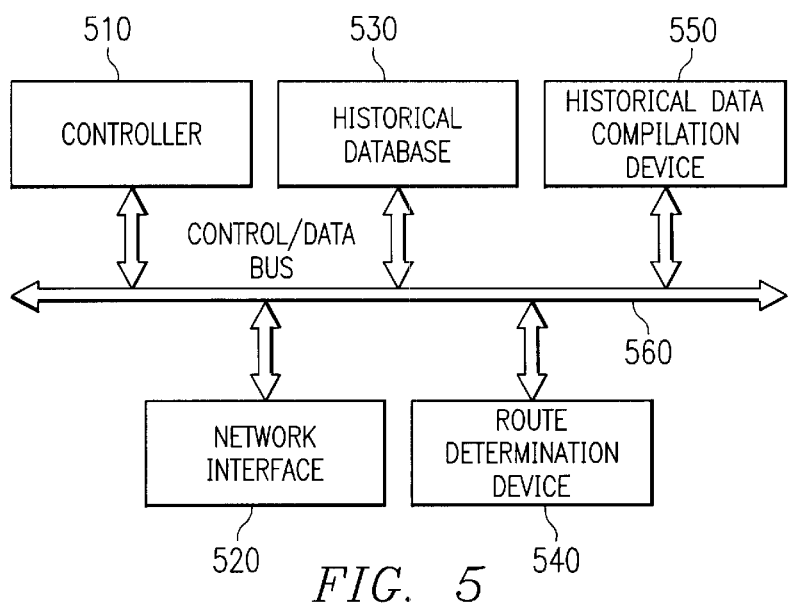
FIG. 5 is an exemplary functional block diagram of the vehicle routing server according to the present invention.
FIG. 6 is an exemplary diagram of a characteristic database data structure according to the present invention.

FIG. 5 is an exemplary functional block diagram of a vehicle routing server according to the present invention. As with the client device shown in FIG. 4, the elements of the functional block diagram of FIG. 5 may be implemented as hardware, software, or a combination of hardware and software components. In a preferred embodiment, the functional elements shown in FIG. 5 are implemented as software instructions executed by one or more of the hardware elements shown in FIG. 2.

As shown in FIG. 5, the vehicle routing server includes a controller 510, a network interface 520, a route characteristic database 530, a route determination device 540 and a historical data compilation device 550. These elements are coupled with one another via the control/data bus 560. Although a bus architecture is shown in FIG. 5, the present invention is not limited to such and any architecture allowing for the communication of control messages and data between the elements 510–550 may be used without departing from the spirit and scope of the present invention.

The controller 510 controls the overall operation of the vehicle routing server. The controller 510 receives sensor data, historical data and requests for optimum route information via the network interface 520. The sensor data and historical data are compiled by the historical data compilation device 550 to identify characteristics of the various route legs. The compilation may include statistical analysis to determine the characteristics or categorization of characteristics of the various route legs, as described above.

The characteristic information generated by the historical data compilation device 550 is then stored in the route characteristic database 530 in association with an identifier of the route leg or used to update already existing entries in the route characteristic database 530. The characteristic information may then be used by the route determination device 540 to identify an optimum route for a particular request.

The route determination device 540 receives the parameters included in the request for optimum route information received from the client device. The parameters may include, for example, a starting location, ending location, and preferences for an optimum route input by a user. Based on this information, the route determination device 540 identifies one or more route candidates. The route candidates are determined based on map information stored in the route determination device 540. This map information may include, for example, all of the streets within a particular geographic area, preferably partitioned into legs. The legs that make up each route candidate are then analyzed and the route candidates are compared to determine an optimum route.

The analysis of the legs of each of the route candidates may include, for example, identifying a travel time for each leg, identifying a score for each leg, or the like, as described above. The analysis may further include determining a total score for each route candidate and then comparing the total scores to determine an optimum route.

The optimum route information may then be transmitted to the client device via the network interface 520. The optimum route information may include the legs that make up the optimum route as well as any additional information that may be of use to the client device when instructing the user regarding the optimum route. The client device may the use this information in any one of many possible ways to direct the user from the starting location to the ending location.

FIG. 6 is an exemplary diagram of a characteristic database according to the present invention. The particular fields and organization shown in FIG. 6 is for illustrative purposes only and any other fields or organization may be used in addition to or in replacement of those shown in FIG. 6 without departing from the spirit and scope of the present invention.

As shown in FIG. 6, the characteristic database includes a field 610 for a leg identifier, a field 620 for a GPS start location and GPS end location of the leg, and fields 630 for storing identifiers of the various characteristics of the leg. In the particular example shown in FIG. 6, the characteristics include a rain condition, snow condition, ice condition, crime condition, traffic enforcement condition, etc. Each of these characteristics has a score associated with a leg. The scores in the characteristic fields 630 are used when generating a total score for a leg, as well as for the entire route.

When the route determination device 540 retrieves information for legs of a route from the characteristic database, the characteristic information is used along with weights determined based on parameters received in the request from the client device, to determine a score for each leg. The scores for each leg are then summed to obtain a total score for the route. This is done for each route candidate. The total scores for each route candidate are then compared to identify the optimum route which may be, for example, the route candidate having the highest or lowest score, depending on the particular embodiment.

While the example shown in FIG. 6 makes use of score identifiers in each of the characteristic fields 630, other identifiers may be used without departing from the spirit and scope of the present invention. For example, textual identifiers such as "high", "low", "dangerous" and the like may be used rather than numerical scores.

Figure 7:
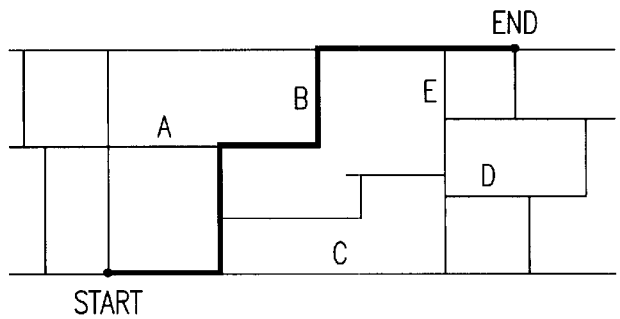
FIG. 7 is an exemplary diagram illustrating optimum route determination according to the present invention.

FIG. 7 provides an exemplary portion of a city road system as an example to illustrate the operation of the present invention. With regard to FIG. 7, assume that the operator of vehicle 114 wishes to travel from the starting point to the ending point. In this particular example, it will be assumed that the routes are partitioned into legs designated by intersections of roadways. Thus, the portion of road between two intersections is considered a leg.

As can be seen from FIG. 7, there are a plurality of routes that may be taken to reach the end point from the start point. Each of these various routes have their own characteristics which influence whether or not the particular route is an optimum route for traveling between the start point and end point in view of the current circumstances and the desires of the operator of the vehicle. As shown in FIG. 7, the leg A is under construction, the leg B is an area where many accidents occur during icy conditions, the leg C has many traffic tickets issued during the weekdays, leg D is in a high crime area and leg E is subject to flooding during rain conditions.

If the user of the vehicle indicates that he/she wishes to avoid high crime areas and areas where a large number of tickets are issued, this criteria makes the legs C and D less likely to be included in the optimum route. Moreover, if the current environmental conditions indicate that rain is falling, or that rain is likely, leg E becomes less likely to be included in the optimum route. After taking into consideration the various characteristics of the legs of the possible routes, other criteria, such as shortest path between the start point and the end point, shortest travel time, and the like may be used to select between the possible routes. Thus, the route denoted by the heavy dark line may be selected as the optimum route for travel between the start and end points. It should be noted that leg B is included in the route since the current road conditions do not indicate any threat of icy conditions.

Figure 8:
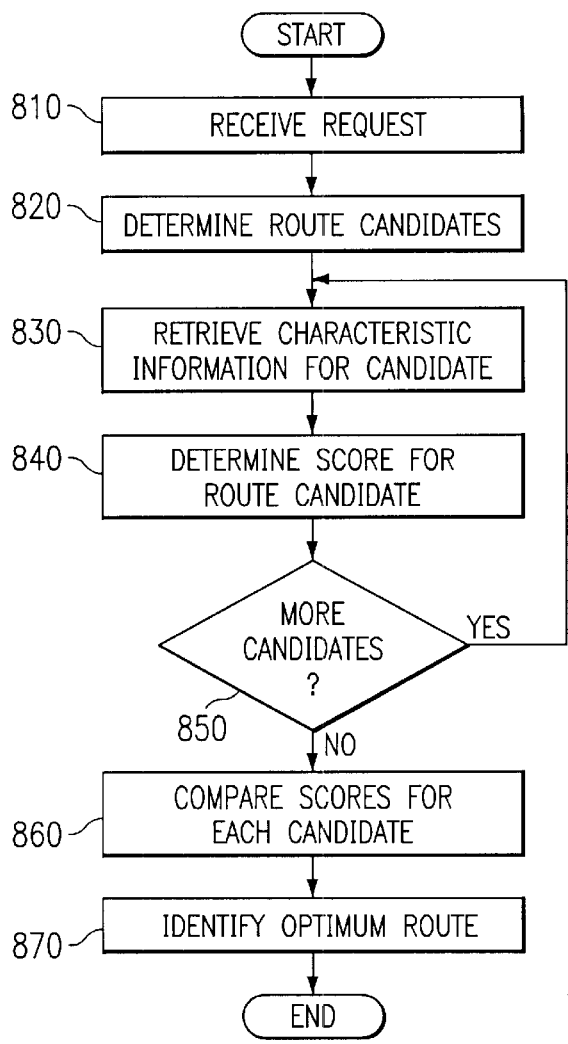
FIG. 8 is a flowchart outlining an exemplary operation of the present invention.

FIG. 8 is a flowchart outlining an exemplary operation of the present invention when receiving a request for an optimum route. As shown in FIG. 8, the operation starts with receiving the request (step 810). Thereafter, the route candidates are determined based on map information (step 820). The characteristic information for each leg of a route candidate is then retrieved from the characteristic database (step 830). A score for the route candidate is then determined based on scores for each of the legs and stored in memory (step 840). The scores are influenced by the characteristic information generated from the historical data, user preferences, and current traveling conditions, for example.

A determination is then made as to whether there are additional route candidates (step 850). If so, the operation returns to step 830 with the next route candidate. If no additional route candidates exist, the scores for each of the route candidates are compared (step 860). An optimum route is then identified based on the comparison and the route information is transmitted to the requesting client device (step 870). Thereafter, the operation ends.

Thus, the present invention provides an apparatus, system, method and computer program product for determining optimum routing of vehicles based on historical information, user preferences and current travel conditions. The present invention provides an enhancement over known vehicle routing systems in that the experiences of travelers are compiled and statistically analyzed to determiner characteristics of each route. These characteristics provide an indicator to a traveler of the most probable experience they will encounter when traveling along a route under various conditions. Thus, a more complete determination of an optimum route may be determined in view of preferences of a user and experiences of other travelers, than the mere determination of shortest route or shortest travel time as in the prior art.

While the above embodiments of the present invention have been described in terms of a land vehicle, such as an automobile, the present invention is not limited to any particular type of vehicle. The present invention may be utilized in determining routes from a starting position to a destination position for any type of vehicle, including fixed wing aircraft, rotary wing aircraft, ships, boats, and the like. Thus, the term "vehicle" as it is used in the present application is not meant to be limited to land vehicles but is intended to mean any type of vehicle.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media such a floppy disk, a hard disk drive, a RAM, a CD-ROM, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of determining a route from a starting position to a destination position for a vehicle, comprising:

obtaining route criteria for selecting a route;

obtaining historical data for a plurality of routes; and selecting a route from the starting position to the destination position based on a comparison of the route criteria to the historical data for a plurality of routes, wherein selecting a route from the starting position to the destination position based on a comparison of the route criteria to the historical data for a plurality of routes includes:

calculating a score for each of the plurality of routes based on a comparison of the route criteria to the historical data for each of the plurality of routes;

comparing the scores for each of the plurality of routes; and selecting a route based on the comparison of the scores for each of the plurality of routes.

2. The method of claim 1, wherein calculating a score for each route of the plurality of routes includes weighing scores for each of a plurality of legs that compromise the route based on the route criteria.

3. The method of claim 1, further comprising obtaining current environmental condition information, wherein selecting a route from the starting position to the destination position includes selecting the route based on a comparison of the route criteria, the current environmental condition information and the historical data for a plurality of routes.

4. The method of claim 1, wherein the historical data for a plurality of routes includes one or more of traffic condition information, road condition information, accident information, and temporal information.

5. The method of claim 1, wherein the plurality of routes are partitioned into legs, and wherein the historical data is historical data for each leg of the plurality of routes.

6. The method of claim 1, wherein the historical data is obtained from one or more historical data suppliers.

7. The method of claim 1, wherein the one or more historical data suppliers includes one or more of a weather information supplier, a traffic condition information supplier, a road condition information supplier, and an accident information supplier.

8. The method of claim 1, wherein the historical information is uploaded from a vehicle to a vehicle routing server when the vehicle completes a portion of a route.

9. The method of claim 1, wherein calculating a score for each of the plurality of routes includes for each route, summing scores for each of a plurality of legs that comprise the route.

10. The method of claim 1, further comprising weighting the scores for each of the plurality of routes based on at least one of current environmental conditions and current temporal conditions.

11. The method of claim 1, further comprising weighting the scores for each of the plurality of routes based on the route criteria.

12. The method of claim 1, wherein selecting a route from the starting position to the destination position based on a comparison of the route criteria to the historical data for a plurality of routes includes using at least one of a neural network, an expert system, a rule based system, an inference engine, and a data mining technique.

13. The method of claim 2, wherein the weighing is further based on at least one of current environmental conditions and current temporal conditions.

14. An apparatus for determining a route from a starting position to a destination position for a vehicle, comprising:

means for obtaining route criteria for selecting a route;

means for obtaining historical data for a plurality of routes; and means for selecting a route from the starting position to the destination position based on a comparison of the route criteria to the historical data for a plurality of routes, wherein the means for selecting a route from the starting position to the destination position based on a comparison of the route criteria to the historical data for a plurality of routes includes:

means for calculating a score for each of the plurality of routes based on a comparison of the route criteria to the historical data for each of the plurality of routes;

means for comparing the scores for each of the plurality of routes; and means for selecting a route based on the comparison of the scores for each of the plurality of routes.

15. The apparatus of claim 14, wherein calculating a score for each route of the plurality of routes includes weighting scores for each of a plurality of legs that comprise the route based on the route criteria.

16. The apparatus of claim 14, further comprising means for obtaining current environmental condition information, wherein the means for selecting a route from the starting position to the destination position includes means for selecting the route based on a comparison of the route criteria, the current environmental condition information and the historical data for a plurality of routes.

17. The apparatus of claim 14, wherein the historical data for a plurality of routes includes one or more of traffic condition information, road condition information, accident information, and temporal information.

18. The apparatus of claim 14, wherein the plurality of routes are partitioned into legs, and wherein the historical data is historical data for each leg of the plurality of routes.

19. The apparatus of claim 14, wherein the historical data is obtained from one or more historical data suppliers.

20. The apparatus of claim 14, wherein the one or more historical data suppliers includes one or more of a weather information supplier, a traffic condition information supplier, a road condition information supplier, and an accident information supplier.

21. The apparatus of claim 14, wherein the historical information is uploaded from a vehicle to a vehicle routing server when the vehicle completes a portion of a route.

22. The apparatus of claim 14, wherein the means for calculating a score for each of the plurality of routes includes means for summing, for each route, scores for each of a plurality of legs that comprise the route.

23. The apparatus of claim 14, further comprising means for weighting the scores for each of the plurality of routes based on at least one of current environmental conditions and current temporal conditions.

24. The apparatus of claim 14, further comprising means for weighting the scores for each of the plurality of routes based on the route criteria.

25. The apparatus of claim 14, wherein the means for selecting a route from the starting position to the destination position based on a comparison of the route criteria to the historical data for a plurality of routes includes at least one of a neural network, an expert system, a rule based system, an inference engine, and a data mining technique.

26. The method of claim 15, wherein the weighing is further based on at least one of current environmental conditions and current temporal conditions.

27. A computer program product in a computer readable medium for determining a route from a starting position to a destination position for a vehicle, comprising:

first instructions for obtaining route criteria for selecting a route;

second instructions for obtaining historical data for a plurality of route of routes; and third instructions for selecting a route from the starting position to the destination position based on a comparison of the route criteria to the historical data for a plurality of routes, wherein the third instructions include:

instructions for calculating a score for each of the plurality of routes based on a comparison of the route criteria to the historical data for each of the plurality of routes;

instructions for comparing the scores for each of the plurality of routes; and instructions for selecting a route based on the comparison of the scores for each of the plurality of routes.

28. The computer program product of claim 27, wherein calculating a score for each route of the plurality of routes includes weighting scores for each of a plurality of legs that comprise the route based on the route criteria.

29. The computer program product of claim 27, further comprising fourth instructions for obtaining current environmental condition information, wherein the third instructions for selecting a route from the starting position to the destination position includes instructions for selecting the route based on a comparison of the route criteria, the current environmental condition information and the historical data for a plurality of routes.

30. The computer program product of claim 27, wherein the historical data for a plurality of routes includes one or more of traffic condition information, road condition information, accident information, and temporal information.

31. The computer program product of claim 27, wherein the instructions for calculating a score for each of the plurality of routes includes instructions for summing, for each route, scores for each of a plurality of legs that comprise the route.

32. The computer program product of claim 27, further comprising instructions for weighting the scores for each of the plurality of routes based on at least one of current environmental conditions and current temporal conditions.

33. The computer program product of claim 27, further comprising instructions for weighting the scores for each of the plurality of routes based on the route criteria.

34. The computer program product of claim 27, wherein the third instructions include instructions for using at least one of a neural network, an expert system, a rule based system, an inference engine, and a data mining technique.

35. The method of claim 28, wherein the weighing if further based on at least one of current environmental conditions and current temporal conditions.

36. The computer program product of claim 27, wherein the plurality of routes are partitioned into legs, and wherein the historical data is historical data for each leg of the plurality of routes.

37. The computer program product of claim 27, wherein the historical data is obtained from one or more historical data suppliers.

38. The computer program product of claim 27, wherein the one or more historical data suppliers includes one or more of a weather information supplier, a traffic condition information supplier, a road condition information supplier, and an accident information supplier.

\* \* \* \* \*

UNITED STATES PATENT AND TRADEMARK OFFICE
CERTIFICATE OF CORRECTION

PATENT NO. : 6,615,133 B2
DATED : September 2, 2003
INVENTOR(S) : Boies et al.

It is certified that error appears in the above-identified patent and that said Letters Patent is hereby corrected as shown below:

Column 11,
Line 10, after "that", delete "compromise" and insert -- comprise --.
Line 52, after "wherein the", delete "weighing" and insert -- weighting --.

Column 12,
Line 50, after "wherein the", delete "weighing" and insert -- weighting --.
Line 59, after "plurality", delete "of route".

Column 14,
Line 10, after "wherein the", delete "weighing" and insert -- weighting --.

Signed and Sealed this

Fourth Day of May, 2004

JON W. DUDAS
*Acting Director of the United States Patent and Trademark Office*

Disclaimer 6,615,133 — Stephen J. Boies, Mahopac, NY (US); Samuel H. Dinkin, Austin, TX; David Perry Greene, Ossining, NY (US); Paul Andrew Moskowitz, Yorktown Heights, NY (US);Philip Shi-lung.Yu, Chappagua, NY (US). APPARATUS, SYSTEM, METHOD AND COMPUTER PROGRAM PRODUCT FOR DETERMINING AND OPTIMUM ROUTE BASED ON HISTORICAL INFORMATION. Patent dated Sept. 2, 2003. Disclaimer filed Oct. 4, 2006, by the assignee, International Business Machines Corporation.

Hereby enters this disclaimer to all claims of said patent.

*(Official Gazette February 27, 2007)*